United States Patent [19]

Sciaroni

[11] Patent Number: 4,767,903
[45] Date of Patent: Aug. 30, 1988

[54] PROCESS AND APPARATUS FOR DETERMINING THE ELECTROEROSIVE COMPLETION OF A STARTING HOLE

[75] Inventor: Boris Sciaroni, Locarno, Switzerland

[73] Assignee: AG Fur Industrielle Elektronik AGIE, Losone, Switzerland

[21] Appl. No.: 813,109

[22] Filed: Dec. 24, 1985

[30] Foreign Application Priority Data

Dec. 31, 1984 [DE] Fed. Rep. of Germany ....... 3447870

[51] Int. Cl.$^4$ ............................................. B23H 7/26
[52] U.S. Cl. .............................. 219/69 M; 204/129.2; 204/224 M; 219/69 C; 219/69 G
[58] Field of Search ........... 204/224 M, 129.2, 129.25; 219/69 G, 69 C, 69 M, 69 V; 408/6, 7, 14, 15; 318/430, 434, 466, 468, 478, 479, 626

[56] References Cited

U.S. PATENT DOCUMENTS

| | | | |
|---|---|---|---|
| 3,219,568 | 11/1965 | Wilkinson | 204/224 M |
| 3,385,947 | 5/1968 | Inoue | 219/69 M |
| 3,386,907 | 6/1968 | Abt | 204/224 M |
| 3,389,313 | 6/1968 | Reynolds | 318/434 |
| 3,562,476 | 2/1971 | Rupert | 219/69 G |
| 3,637,481 | 1/1972 | Williams | 204/224 M |
| 3,793,169 | 2/1974 | Joslin | 204/224 M |
| 4,039,779 | 12/1975 | Rupert | 219/69 G |
| 4,107,504 | 8/1978 | Dinsdale | 219/69 G |
| 4,146,770 | 3/1979 | Dinsdale et al. | 219/69 C |
| 4,229,635 | 10/1980 | Dinsdale | 219/69 C |
| 4,387,284 | 6/1983 | Nicholas et al. | 219/69 G |
| 4,415,791 | 11/1983 | Yamada et al. | 219/69 G |
| 4,645,992 | 2/1987 | Ritenour | 318/430 |

FOREIGN PATENT DOCUMENTS

30416 6/1981 European Pat. Off. ............ 318/434

Primary Examiner—A. D. Pellinen
Assistant Examiner—Geoffrey S. Evans
Attorney, Agent, or Firm—Neuman, Williams, Anderson & Olson

[57] ABSTRACT

The completion of a starting hole produced by spark erosion in a workpiece by use of a starter electrode in an electroerosion machine is automatically detected by a sudden change in a sensed process parameter when the starter electrode has passed through the workpiece.

10 Claims, 3 Drawing Sheets

PROCESS AND APPARATUS FOR DETERMINING THE ELECTROEROSIVE COMPLETION OF A STARTING HOLE

BACKGROUND OF THE INVENTION

The invention relates to a process and an apparatus for determining the completion of a starting hole machined through a workpiece, where the starting hole is produced by spark erosion on an electroerosion machine using a starter electrode.

Prior to the actual spark erosive working of a workpiece, it is known to machine a starting hole through the workpiece by spark erosion. For this purpose an electroerosion machine is used having a starter electrode with adequate inherent rigidity. The starter electrode and workpiece are connected to the output of an electric supply device, typically a pulse generator. The circuit is closed through the working zone, i.e. the gap between the tip of the starter electrode and the workpiece. For producing the starting hole, the starter electrode is generally moved by a motor-driven spindle in a vertical direction through the workpiece or drill hole. The working gap or drill hole is frequently rinsed or cleaned in that pressurized fluid is pumped from the outside through the hollow starter electrode. As the spark erosive machining of starting holes is well known, reference can be made to the relevant literature to avoid unnecessary explanation here.

In the presently known systems for the production of starting holes on electroerosion machines, there exists the problem of determining the actual completion of the hole. When producing a single starting hole, the continuous monitoring of the drill hole is usually left to the operator. As soon as the operator determines the actual completion of the bore, i.e. the completion of the starting hole, the equipment is stopped. In the digitally controlled production of starting holes, the feed or advance that was imparted to the starter electrode was used as an evaluation quantity for determining the completion of the starting hole. This was essentially based on the idea that the starting hole is completed if a total feed corresponding substantially to the workpiece thickness is imparted to the starter electrode, optionally taking into account the wear of the starter electrode during the drilling process. However, the problem arose that electrode wear is not constant and can instead vary between 50 and 200 percent. The wear is also dependent on the temperature, the pollution or contamination state in the drill hole, the pressure of the rinsing fluid, the materials used for the electrode and the workpiece, as well as other factors. The generally unforeseeable extent of the wear is particularly serious if several starting holes are to be produced with the same starter electrode. Thus, due to the unknown extent of the wear the constant change in the starter electrode length is also unknown. In the case of several successively made starter holes, this can lead to obtaining only a blind hole instead of a completely machined starting hole. A blind hole could fundamentally be avoided in that from the outset a fictitious rate of electrode wear was programmed into the digital control of the drilling movement, which wear rate was well above the average wear. However, this measure suffers from the disadvantage that the electrode may still be driven by its feed mechanism after it has already passed through the workpiece and has already abutted against another workpiece or machine part, e.g. a clamping member. The latter situation can then lead to the destruction of the starter electrode.

For the aforementioned reasons, a sensible preprogramming of the starter electrode movement is difficult, if not impossible, to perform under economic considerations.

SUMMARY OF THE INVENTION

On the basis of this technical background, the invention relates to the provision of a process and an apparatus for the simple, universal determination of the actual completion of a starting hole produced by spark erosion in a workpiece by means of a starter electrode.

From the process standpoint, this problem is solved in that in the case of the process of the type described hereinabove there is an automatic detection of a sudden change in a process parameter occurring during or after the starter electrode tip has passed out of the workpiece again.

From the apparatus standpoint, this problem is solved in that in the known means for the electroerosive production of a starter hole in a workpiece by means of a starter electrode, a sensor is designed and arranged for detecting the sudden change of a process parameter occurring during or after the starter electrode tip has passed out of the workpiece again.

The solution according to the invention has the advantage that the completion or termination of the starting hole can always be reliably determined independently of electrode wear, the depth of the bore, the starter electrode material, the workpiece material, the stability of the working process, the pollution conditions in the working gap and the like.

According to a preferred embodiment, during drilling the starting hole is rinsed by a liquid and the sudden drop in the rinsing pressure when the starter electrode tip passes out of the workpiece again is determined with the aid of a corresponding sensor. According to another preferred embodiment, which may be used in conjunction with other embodiments, the sudden drop in the power supplied by the electrical supply device, e.g. a pulse generator, to the working zone is determined by means of a corresponding sensor. If, in accordance with another preferred embodiment, a stop is provided behind the workpiece in the drilling direction, then the striking of the starter electrode tip against the stop can be determined. If an automatically operating drive means is provided for the starter electrode, then in a further development of the aforementioned embodiment the stopping of the starter electrode or part of the drive means thereof is determined by means of a corresponding sensor. According to another preferred embodiment, the drive means for the starter electrode feed has an electric drive motor. In this embodiment, which may be used in addition to sensing a sudden rise in the electric power consumption of the drive motor, the striking of the starter electrode tip against the stop is determined by means of a corresponding sensor, e.g. a wattmeter. According to another preferred embodiment, the stop has a bare electrical conductor on its side facing the starting hole outlet and is at a different potential than the starter electrode. In this case, preferably the start of the current flow in the conductor is determined as a result of the contact with the starter electrode.

For determining the sudden change in the value of a process parameter when the starter electrode tip passes out of the workpiece, the sensors preferably have in each case a discriminator stage or a threshold value stage.

BRIEF DESCRIPTION OF THE DRAWINGS

The invention is described in greater detail hereinafter relative to the illustrative embodiments and the attached drawings, which show.

DETAILED DESCRIPTION OF THE PREFERRED EMBODIMENTS

Figure 1:
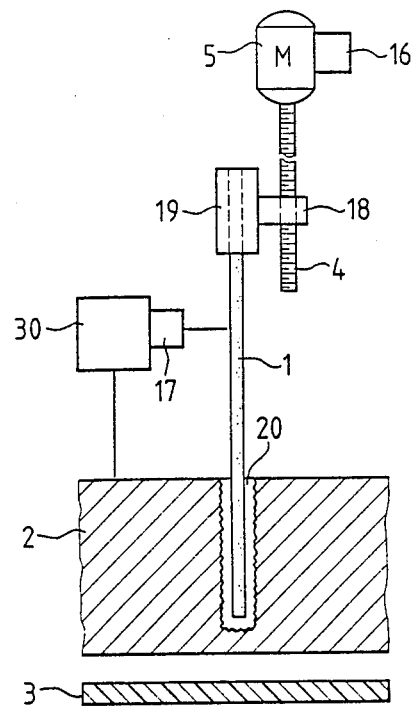
FIG. 1 A first embodiment of the present invention for determining the drop in the power supplied by the supply device and/or the rise in the power absorbed by the starter electrode feed means following the exit of the starter electrode tip from the workpiece or the striking of said tip against a stop.

All the drawings are longitudinal sections through the working zone of the particular embodiment. The same reference numerals are used for functionally identical parts in the various drawings.

Each working zone has a starter electrode 1 and a workpiece 2. The starter electrode 1 and the workpiece 2 are arranged in an electroerosion machine in a known manner. The starter electrode 1 spark erosively machines in the workpiece 2 a drill hole 20, which subsequently forms the starting hole. The starter electrode 1 has an adequate inherent rigidity for this purpose. It is advanced by a drive in the direction of the workpiece 2 and is passed through the same. The drive essentially comprises an electric motor 5, a spindle 4 driven by said electric motor and an elevating nut 18 engaging with the spindle. The starter electrode 1 and the workpiece 2 are connected in a known manner to an electric supply means, which supplies the electrical energy required for spark erosive machining.

Figure 2:
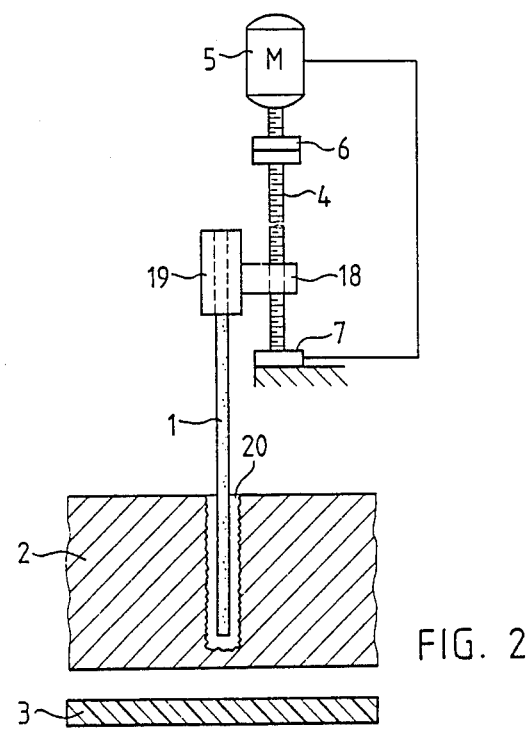
FIG. 2 A second embodiment of the invention for determining the change of movement of the starter electrode or parts of its drive means when the starter electrode tip strikes against a stop.
Figure 5:
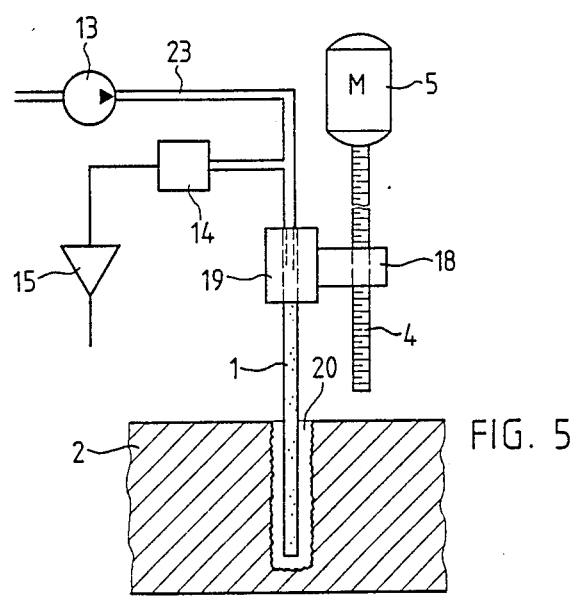
FIG. 5 Another embodiment of the invention for determining the rinsing pressure drop when the electrode tip passes out of the workpiece.
Figure 4:
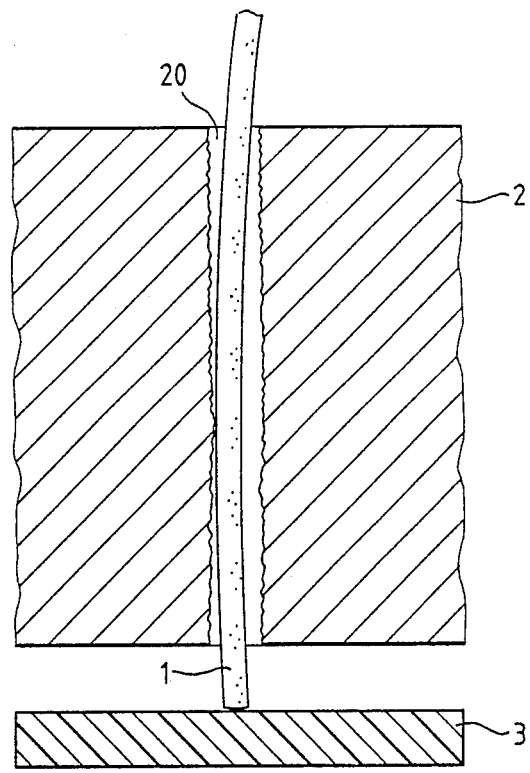
FIG. 4 Another embodiment of the invention with a surface-treated starter electrode.

In the embodiments shown in FIGS. 1, 2 and 5, the elevating nut 18 is fixed to a driver 19, in which is secured the starter electrode 1.

The embodiments shown in FIGS. 1 to 4, viewed in the feed direction of the starter electrode, are provided with a stop 3 located below the expected exit of the starter electrode from the workpiece 2. The stop 3 comprises a fixed insulated plate, made, for example, from a synthetic material.

In these embodiments, the starter electrode 1 is advanced by its feed system after completing the drill hole 20, or starting hole, until the tip of the starter electrode strikes against the stop 3 positioned closely below the workpiece 2. Thus, there is suddenly a mechanical resistance to the further advance of the starter electrode 1.

In the embodiment shown in FIG. 1, this sudden increase in resistance is sensed by measuring the power consumed by electric motor 5 with a wattmeter 16. The sudden increase in the mechanical resistance directed counter to the feed movement is revealed by a sudden power consumption of the electric motor 5. This sudden rise in the power consumption of the electric motor 5 indicates the actual completion of the starting hole in the represented embodiment. The signal obtained from the sudden power increase is also used for driving the spindle 4 in the opposite direction and consequently for drawing the starter electrode 1 out of the drill hole 20.

In the represented embodiment, the starter electrode 1 and the workpiece 2 are connected in a known manner to the output of an electric supply unit in this case a pulse generator 30. In the circuit formed from the pulse generator 30, the starter electrode 1, the working zone, and the workpiece 2 is connected a wattmeter 17 which measures the electric power supplied to the working zone by the pulse generator 30.

As soon as the drill hole 20 is machined, i.e. the starter electrode 1 has passed through the workpiece 2, there is substantially no further erosion. This means that the electrical energy consumed in the working zone per unit of time, i.e. the power supplied by pulse generator 30, suddenly drops. Wattmeter 17 measures by means of a discriminator stage the sudden power drop and, consequently, the completion of the starting hole. This signal can also be used for preventing further advance of the starter electrode and for drawing the electrode 1 out of the drill hole 20. If the sudden drop in the power supplied by the pulse generator 30 is only to be measured by means of the wattmeter 17, there is no need for stop 3.

If the processes and apparatus of both embodiments are used, then the measurement of the sudden power consumption of the electric motor 5 using wattmeter 17 can be looked upon as a safety measure, which is only required in the case where the wattmeter 17 does not operate, e.g. due to a fault.

In the embodiment of FIG. 2, the output shaft of electric motor 5 is connected via a slip clutch 6 to the spindle 4. In addition, a speed indicator 7 is connected with the spindle 4 in such a way that it detects the cessation of the rotary movement of the spindle. As soon as the starter electrode 1, after passing through workpiece 2, strikes against the stop 3, the electrode and the spindle 4 stop due to the interposing of the slip clutch 6. The stopping of the spindle 4 is detected by the speed indicator 7. A signal for removing the starter electrode 1 from the drill hole 20 is obtained from the stop signal generated by the speed indicator 7, as shown diagrammatically in FIG. 2 by a connection between the speed indicator 7 and the electric motor 5.

In lieu of or in addition to determining the spindle stoppage, the speed indicator can also detect the stopping of the starter electrode 1.

The slip clutch 6 also has the advantage that it is possible to predetermine in a controlled manner the maximum feed or advance force acting on the starter electrode 1. The slip clutch 6 preferably limits the maximum transferable feed force in such a way that the starter electrode, on striking against the stop 3, does not bend to such an extent as to contact the inner wall of the drill hole 20.

Figure 3:
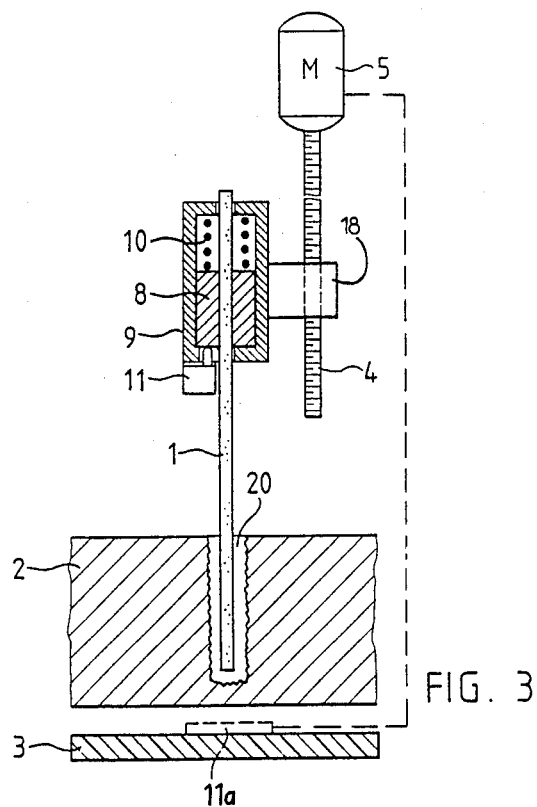
FIG. 3 A further embodiment of the invention for detecting the passage of the electrode tip through the workpiece by means of a switch.

In the embodiment shown in FIG. 3, the elevating nut 18 is connected to a guide casing 9, which contains a vertically displaceable driving slide 8. The driving slide 8 is in turn fixed to the starter electrode 1. The driving slide 8 can move vertically within guide casing 9 in the same way as a piston in a cylinder. A helical spring 10 normally keeps the slide 8 in its bottom position. The two abutments for the helical spring 10 are a contact surface in the guide casing 9, positioned above the driving slide 8, and the head surface of the driving slide 8.

An electric on-off switch 11 is arranged in the bottom surface of the guide casing 9 and projects upwards in the direction of the driving slide 8 by means of a pin under spring bias projecting out of the bottom surface of the guide casing 9. As a result of the force of the helical spring 10, the driving slide 8 is so strongly pressed against the switch pin, that the switch is normally always held in one of its two possible states. As soon as the tip of the starter electrode strikes against the stop 3 after passing out of workpiece 2, the starter electrode 1 and the driving slide 8 stop. The spindle drive continues to move the guide casing 9 downwards. This movement continues until the switch pin of the switch 11 has been released to such an extent that switch 11 passes into its other switching state. This supplies a signal for the withdrawal of starter electrode 1 from the finished starting hole.

In the form of the on-off switch 11a shown in broken line form, the two-position switch can be arranged directly on the stop 3 as an alternative embodiment. When the starter electrode 1 contacts the switch 11a and causes the switch 11a to pass into its second switching state, the resulting signal may be used to stop and optionally reverse the electric motor 5 through an operative connection between the switch 11a and the electric motor 5, shown diagrammatically in FIG. 3. It is sufficient in this case to merely connect the starter electrode 1 directly through the driver 19 to the elevating nut 18 as shown in FIG. 1. It would of course be possible to arrange such two-position switches at other appropriate positions.

In the embodiment shown in FIG. 5, the starter electrode 1 is internally hollow, and this can fundamentally also apply to the other embodiments. During erosion, a hydraulic pressure pump 13 pumps pressurized rinsing medium through a pressure line 23 and through the starter electrode 1, so that the entire drill hole 20 is continually rinsed or cleaned. The quantity of rinsing medium which actually flows through the starter electrode 1 during erosion is highly dependent on the liquid resistance in the drill hole 20. Fundamentally, the hydraulic resistance increases with the drilling depth. However, once drilling is ended the starter electrode 1 passes through the workpiece 2, and the hydraulic pressure suddenly drops. The pressure pattern is sensed by a hydraulic pressure sensor 14 with a following signal amplifier 15. The sudden pressure drop gives a clear signal of the completion of the starting hole, and from it can be derived a signal for withdrawing the starter electrode 1 from the starting hole.

It can be gathered from what has been stated that in the second variant of the embodiment according to FIG. 1 (measurement of the drop in the pulse generator power) and in the embodiment according to FIG. 5, no stop 3 is really required. Thus, in these embodiments no special demands are made regarding the inherent rigidity of the starter electrode 1.

Figure 6:
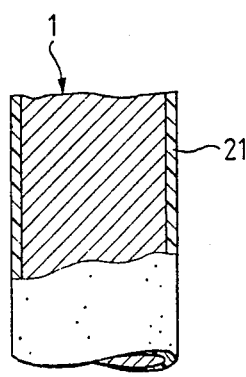
FIG. 6 an enlarged section of the surface-treated starter electrode shown in FIG. 4.

In the other embodiments, the inherent rigidity of the starter electrode 1 should be selected in such a way that during the time between its striking against the stop 3 and its withdrawal from the starting hole it does not bend against the inner wall of the latter. According to the embodiment shown in FIG. 4, for safety purposes the starter electrode 1 is externally coated with an insulating varnish 21 (see FIG. 6), which prevents a short-circuit in the case where, despite its inherent rigidity, the electrode 1 strikes against the inner wall of the drill hole 20.

According to another embodiment, at least in the area opposite the expected exit of the starter electrode from the drill hole 20, the stop 3 has a bare electrical conductor. The latter is at a different electric potential relative to the starter electrode 1. When the starter electrode 1 contacts the stop 3 in the vicinity of its conductor, a current starts to flow. This current flow can for example be measured by means of a conventional ammeter. A signal for withdrawing the starter electrode 1 from the drill hole 20 can be derived from the current signal.

The starter electrode 1 can be designed in such a way that it rotates about its own axis, particularly during the formation of the drill hole 20.

What is claimed is:

1. In the spark erosive machining of a drill hole through a workpiece on an electroerosion machine by the use of a starter electrode, a process for determining the completion of the drill hole comprising the steps of automatically sensing the state of a preselected process parameter during the machining of the drill hole and sensing a sudden change in the process parameter, wherein a rigid stop is provided substantially adjacent to and behind the workpiece in the machining direction, and the completion of the drill hole is determined by contact between the tip of the starter electrode and the stop.

2. A process according to claim 1 wherein the stop is fixed; the starter electrode has attached to it a drive means for advancing the starter electrode; and the completion of the drill hole is determined by the cessation of the advance of the drive means.

3. A process according to claim 1 wherein an electric drive motor is provided for advancing the starter electrode, and the completion of the dril hole is determined by a rise in the electric power consumption of the electric drive motor above a predetermined value.

4. A process according to claim 1 wherein the stop includes an electric conductor positioned in the path of the tip of the starter electrode and having an electric potential different than that of the starter electrode, and the completion of the drill hole is determined by sensing a current flow in the electric conductor.

5. In the spark erosive machining of a drill hole through a workpiece on an electroerosion machine by the use of a starter electrode, an apparatus for determining the completion of the drill hole comprising means for automatically sensing the state of a preselected process parameter during the machining of the drill hole and means for sensing a sudden change in the process parameter, wherein a rigid stop is provided substantially adjacent to and behind the workpiece in the machining direction, and the completion of the drill hole is determined by contact between the tip of the starter electrode and the stop.

6. An apparatus according to claim 5 wherein there is provided an axially rotatable spindle means in threaded engagement with the starter electrode for moving the starter electrode along the axis of feed when the spindle is rotated; a drive motor operatively connected to the spindle for rotating the spindle through a slip clutch; and means for sensing the cessation of rotation of the spindle, said preselected process parameter being the rotation of the spindle.

7. An apparatus according to claim 5 wherein there is provided an electric drive motor for advancing the starter electrode, means for sensing the electric power consumption of the electric drive motor, and means for comparing the sensed electric power consumption with a predetermined value, said preselected process parameter being the electric power consumption of the electric drive motor.

8. An apparatus according to claim 5 wherein there is provided a two-position switch arranged with respect to the starter electrode so that the contact of the starter electrode with the stop causes the switch to change from one state indicative of machining to the second state indicative of the completion of the drill hole.

9. An apparatus according to claim 5 wherein the stop includes an electric conductor positioned in the path of the tip of the starter electrode and having an electric potential different than that of the starter electrode, and there is further provided a means for sensing a current flow in the electric conductor indicative of completion of the drill hole.

10. An apparatus according to claim 5 wherein the starter electrode includes an outer, electrically insulated coating.

* * * * *